United States Patent [19]
Saiki et al.

[11] Patent Number: 5,353,635
[45] Date of Patent: Oct. 11, 1994

[54] APPARATUS FOR DETECTING THE ROTATIONAL DISPLACEMENT OF A ROTATING MEMBER

[75] Inventors: Toshinari Saiki; Yuji Takeda, both of Toyota, Japan

[73] Assignee: Toyota Jidosha Kabushiki Kaisha, Toyota, Japan

[21] Appl. No.: 15,935

[22] Filed: Feb. 10, 1993

[30] Foreign Application Priority Data

Apr. 10, 1992 [JP] Japan .................................. 4-091244

[51] Int. Cl.⁵ ............................................. G01M 15/00
[52] U.S. Cl. ..................................... 73/117.2; 364/431.1
[58] Field of Search .................... 73/116, 117.2, 117.3; 364/431.1; 123/494, 414

[56] References Cited

U.S. PATENT DOCUMENTS

| | | | |
|---|---|---|---|
| 3,930,201 | 12/1975 | Ackermann et al. | |
| 4,072,893 | 2/1978 | Huwyler . | |
| 4,181,884 | 1/1980 | Shirasaki et al. | |
| 4,233,592 | 11/1980 | Leichle . | |
| 4,262,251 | 4/1981 | Fujishiro et al. | |
| 4,321,580 | 3/1982 | Deleris . | |
| 4,338,813 | 7/1982 | Hunninghaus et al. | 73/116 |
| 4,558,591 | 12/1985 | Francis et al. | 73/116 |
| 4,766,865 | 8/1988 | Hartel | 123/414 |
| 4,924,830 | 5/1990 | Abe | 123/414 |
| 5,070,727 | 12/1991 | Davis et al. | 73/116 |
| 5,156,125 | 10/1992 | Fukui et al. | 123/414 |

FOREIGN PATENT DOCUMENTS 61-502557 1/1986 Japan .
61-213714 9/1986 Japan .

OTHER PUBLICATIONS

Lexus 1990 New Car Features.

*Primary Examiner*—Robert Raevis
*Attorney, Agent, or Firm*—Kenyon & Kenyon

[57] ABSTRACT

A first signal generating apparatus generates unit angular signals at predetermined angular intervals, in relation to the revolution of a first rotary shaft. The first signal generating apparatus generates a first reference signal which has a different timing than that of the unit angular signals. A second rotary shaft completes one revolution while the first rotary shaft completes two revolutions. A second signal generating apparatus generates a second reference signal with every revolution of the second rotary shaft. A counting apparatus counts the unit angular signals and stores the counted value, and initializes the counted value every time the first reference signal is generated. An angular detecting apparatus determines whether or not the second reference signal is generated by the second signal generating apparatus. Based on the result of this inquiry, the angular detecting apparatus measures the rotational or angular displacement of the first rotary shaft.

9 Claims, 7 Drawing Sheets

APPARATUS FOR DETECTING THE ROTATIONAL DISPLACEMENT OF A ROTATING MEMBER

BACKGROUND OF THE INVENTION

1. Field of the Invention

This invention generally relates to a rotational displacement apparatus for detecting the angular displacement of a rotating member such as a shaft. More specifically, the present invention relates to an apparatus which detects the crank angle of a multiple cylinder type internal combustion engine, in order to select the cylinder, for controlling the ignition timing or the fuel injection of the engine.

2. Description of the Related Art

It is known in the field of internal combustion engines that the angular displacement of the crank shaft should be measured in correspondence with each stroke, to electronically control the ignition timing or the amount of injected fuel per cylinder. Such strokes range from the intake stroke to the exhaust stroke.

There exist various types of conventional devices for detecting the crank angle (CA). For example, Japanese Unexamined Patent Publication No. 61-213714 discloses one such device. The device described in the above publication includes a first sensor for detecting a unit rotational angle of a crank shaft, a second sensor for detecting an upper dead point of a piston, and a third sensor for specifying a cylinder to be ignited. The first sensor comprises a circular disk, or body fixedly, connected to the crank shaft, and an electromagnetic pickup, which is arranged adjacent to the circular disk. The circular disk has a plurality of projections, or gear teeth, which are arranged at equal circular pitches (for example, CA=30°), along the periphery of the disk. Every time the crank shaft rotates by a predetermined angle (30 degrees), the electromagnetic pickup detects one tooth. Therefore, the first sensor transmits a unit angular signal.

The second sensor comprises a projection formed along the periphery of the crank shaft, and an electromagnetic pickup arranged adjacent to the projection. Whenever the crank shaft makes one revolution (CA=360°), the electromagnetic pickup detects the projection. Thus, the second sensor transmits a first reference signal.

Further, the third sensor comprises a projection formed along the periphery of a camshaft of the internal combustion engine and an electromagnetic pickup arranged adjacent to the projection. Whenever the cam shaft makes one revolution (CA =720°), the electromagnetic pickup detects the projection. The third sensor transmits a second reference signal. As the latter transmitted reference signals are fed into a microcomputer of a detecting unit, the computer calculates an appropriate crank angle corresponding to each stroke of the engine. However, the apparatus for detecting the crank angle described above requires three pickups corresponding to each one of the sensors described above, which leads to an increase in the number of parts.

Japanese National Publication No. 61-502557, which corresponds to the international application No. PCT/DE85/00080, discloses an apparatus for detecting a rotational or angular displacement. The apparatus comprises a circular disk or body, that is fixedly connected to the crank shaft, and an electromagnetic pickup arranged adjacent to the circular disk. The circular disk has a plurality of projections or gear teeth which are arranged at equal circular pitches, along the periphery. As one out of the plurality of projections has been removed from the disk, a first gap between two specific adjacent projections, with a gap therebetween, has a different width, compared to that of a second gap between the remaining adjacent projections.

The sensor transmits unit angle signals at every predetermined angular interval, when the projections that are spaced by the second gap, pass over the electromagnetic pickup. The sensor transmits a reference signal which has a different angular interval, when the projections that are spaced by the first gap, pass over the electromagnetic pickup. Therefore, the sensor disclosed in the above-described publication (61-502557) can be applied to the apparatus disclosed in the above publication (Japanese Unexamined Patent Publication No. 61-213714), as the first and second sensors, for detecting the rotational angle of a crank shaft and for detecting the upper dead point of the piston.

However, it requires a maximum crank angle (CA=720°), before the first cylinder is defined, by changing the configuration of the circular disk in the sensor, which is disposed at the crankshaft side, when four cylinders of the internal combustion engine are activated. Therefore, as this crank angle detecting apparatus is combined with a distributorless ignition system (DLI) of an ignition timing apparatus, for use in a gasoline engine, the engine is caused to ignite after the crankshaft rotates more than 720 degrees. The starting of the engine is slightly delayed. Such problem is similarly generated in a fuel injection system, which injects the fuel independently into each cylinder during the engine activation period, or in a fuel injection system which injects fuel into every group, including multiple cylinders.

The present invention aims at overcoming the foregoing disadvantages of the prior art.

SUMMARY OF THE INVENTION

A primary object of the present invention is to provide an apparatus for detecting a rotational angle of the circular disk, such as the crank shaft, before a rotary shaft rotates by 720 degrees. When this apparatus is employed in the internal combustion engine, the apparatus measures the rotational angle or displacement, and starts specifying the cylinders before the crank shaft rotates by 720 degrees. Therefore, the ability for starting the engine can be significantly improved.

To achieve the foregoing and other objects and in accordance with the purpose of the present invention, a new and improved apparatus for detecting a rotational angle or displacement of a rotary shaft, is proposed herein.

The apparatus includes a first signal generating device which generates a unit angle signal every time a first rotary shaft rotates by a predetermined unit angle interval. Further, this first signal generating device generates a first reference signal having a different timing from the unit angular signal, at every revolution of the first rotary shaft.

A second rotary shaft completes one revolution whenever the first rotary shaft completes two revolutions. A second signal generating device generates a second reference signal with every revolution of the second shaft.

A counting device counts the unit angle signal and stores the counted value. The counting device resets the counted value whenever a first reference signal is generated. When the value of the unit angle signal counted by the counter reaches a predetermined value, a rotational angle detector determines whether the second reference signal is generated by the second signal generating device. Based on such determination, the rotational angle detector detects a rotational angle of the first rotary shaft.

BRIEF DESCRIPTION OF THE DRAWINGS

The features of the present invention that are believed to be novel, are set forth with particularity in the appended claims. The invention, together with the objects and advantages thereof, may best be understood by reference to the following description of the preferred embodiments, together with the accompanying drawings, in which:

DETAILED DESCRIPTION OF THE PREFERRED EMBODIMENT

A preferred embodiment of an apparatus for detecting a crank angle of a four-cylinder gasoline engine, according to the present invention, will now be described referring to FIGS. 1 through 8.

Figure 1:
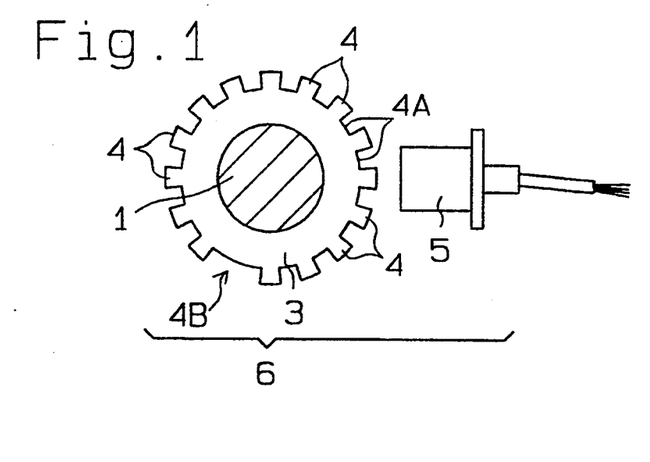
FIG. 1 shows a simplified schematic view of a first sensor for a crank shaft, according to a first embodiment of the present invention.
Figure 2:
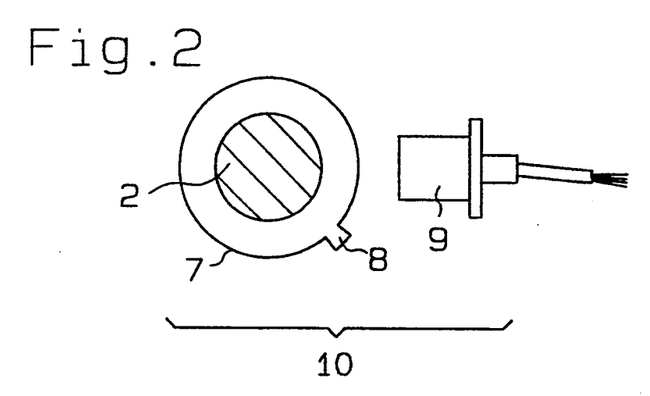
FIG. 2 shows a simplified schematic view of a second sensor for a cam shaft, according to the first embodiment of the present invention.

As shown in FIGS. 1 and 2, the gasoline engine includes a crank shaft 1, which transforms the reciprocal movement of the pistons into a rotational movement. Further, the engine includes a cam shaft 2 which includes cams, for controlling the opening and closing timing of the corresponding intake and exhaust valves. The cam shaft 2 is operatively connected to the crank shaft 1, via belts or chains. The cam shaft 2 completes one revolution for every two revolutions by the crank shaft 1.

A first rotor 3, is made of magnetic material and has a generally circular disk shape. It is connected to the crank shaft 1, so that the rotor 3 rotates integrally with the crank shaft 1. A plurality of teeth 4 are equidistantly spaced apart along the periphery of the rotor 3, at equal angular intervals. In the preferred embodiment, the angular interval is set to about 22.5 degrees. Two consecutive teeth are spaced apart by a first recess 4A. One of the teeth 4 is removed to form a second recess 4B between the adjacent teeth. The second recess 4B is wider than the first recess 4A.

Figure 8:
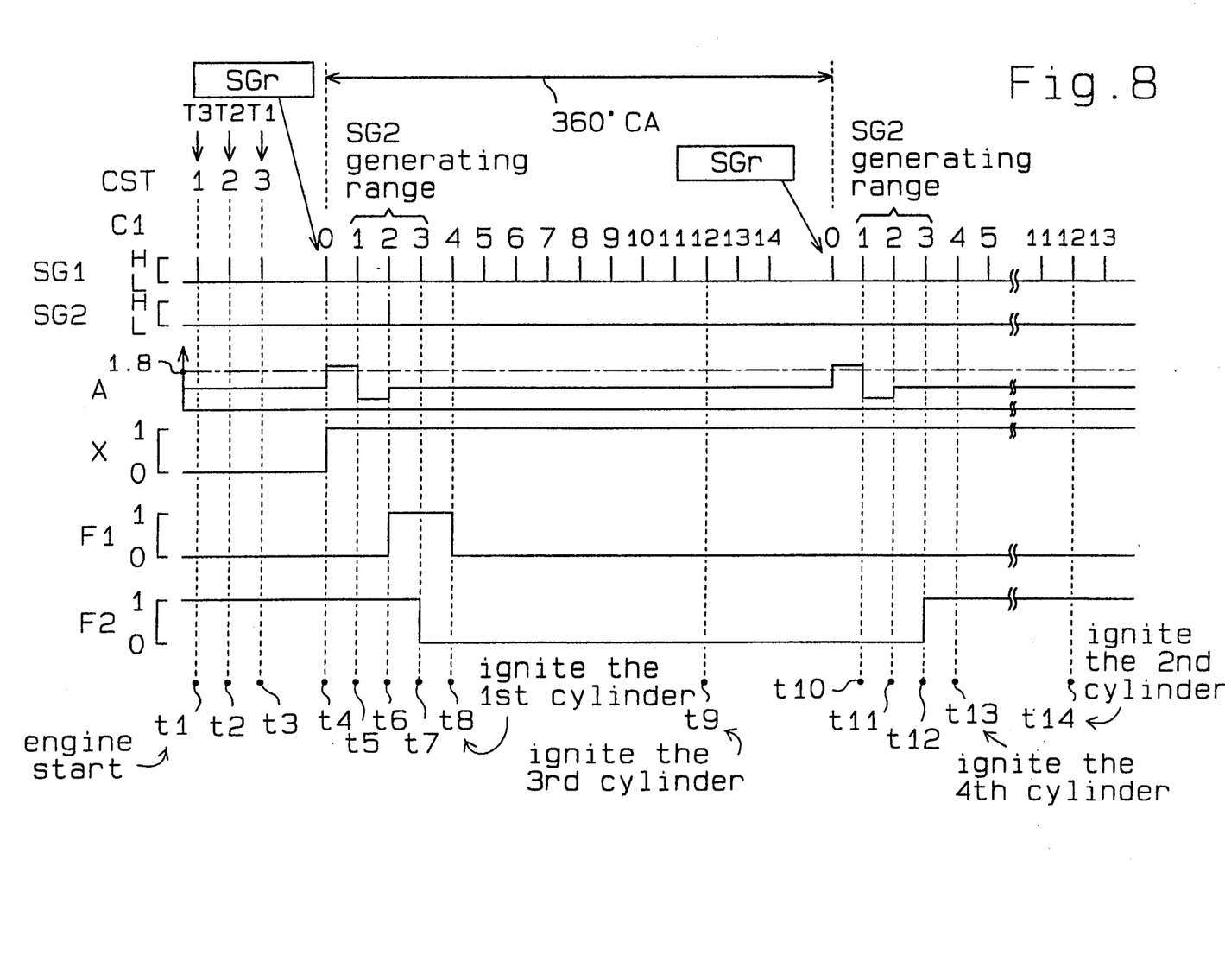
FIG. 8 shows a timing chart and illustrates the operation of the first embodiment.

A first electromagnetic pickup 5 is disposed in the vicinity of the rotor 3, and is arranged adjacent to the periphery of the rotor 3. The first electromagnetic pickup 5 includes a coil (not shown), which uses a well-known characteristic of inductance fluctuation, which results when the relative position of the pickup 5, with respect to each tooth, is changed. Therefore, the first electromagnetic pickup 5 generates and transmits an angular signal SG1, each time the tooth 4 and the recess 4A of the rotor 3 cross the pickup 5 in response to the revolution of the crank shaft 1 (as shown in FIG. 8). When the second recess 4B coincides with the pickup 5, a reference signal SGr is generated and transmitted. According to this embodiment, a first sensor 6 includes the first rotor 3 and the first electromagnetic pickup 5.

A second rotor 7 is connected to the cam shaft 2, so that the rotor 7 rotates integrally with the cam shaft 2. A second tooth 8, is made of magnetic material, and is formed along the periphery of the rotor 7. A second electromagnetic pickup 9, is similar to the pickup 5, and is disposed adjacent to the periphery of the second rotor 7. The second electromagnetic pickup 9 generates and transmits a cylinder detection signal SG2, each time the second tooth 8 coincides with the pickup 9, in response to the revolution of the crank shaft 1. According to this embodiment, the pickup 9 transmits one cylinder detection signal SG2 each time the crank shaft 2 rotates twice (CA=720°), as shown in FIG. 8. A second sensor 10 for cylinder detection, includes the second rotor 7 and the second electromagnetic pickup 9.

According to this embodiment, the second rotor 7 is connected to the camshaft 2, and establishes the following relationship with respect to the recess 4B. The tooth 8 will coincide with the pickup 9, when the recess 4B and a predetermined number (one to three) of subsequent teeth 4, pass in front of the pickup 5. However, the cam shaft 2 completes one revolutions for every two revolutions by the crank shaft 1. Therefore, after the tooth 8 coincides with the pickup 9 while the first rotor 3 of the crank shaft 1 is making its first revolution, the next time the tooth 8 coincides with the pickup 9, will take place during the third revolution of the first rotor 3.

According to this embodiment, an "expecting period" for generating the cylinder detection signal SG2, as shown in FIG. 8 is defined as the period of time during which the recess 4B and one to three teeth 4 pass in front of the pickup 5.

Figure 3:
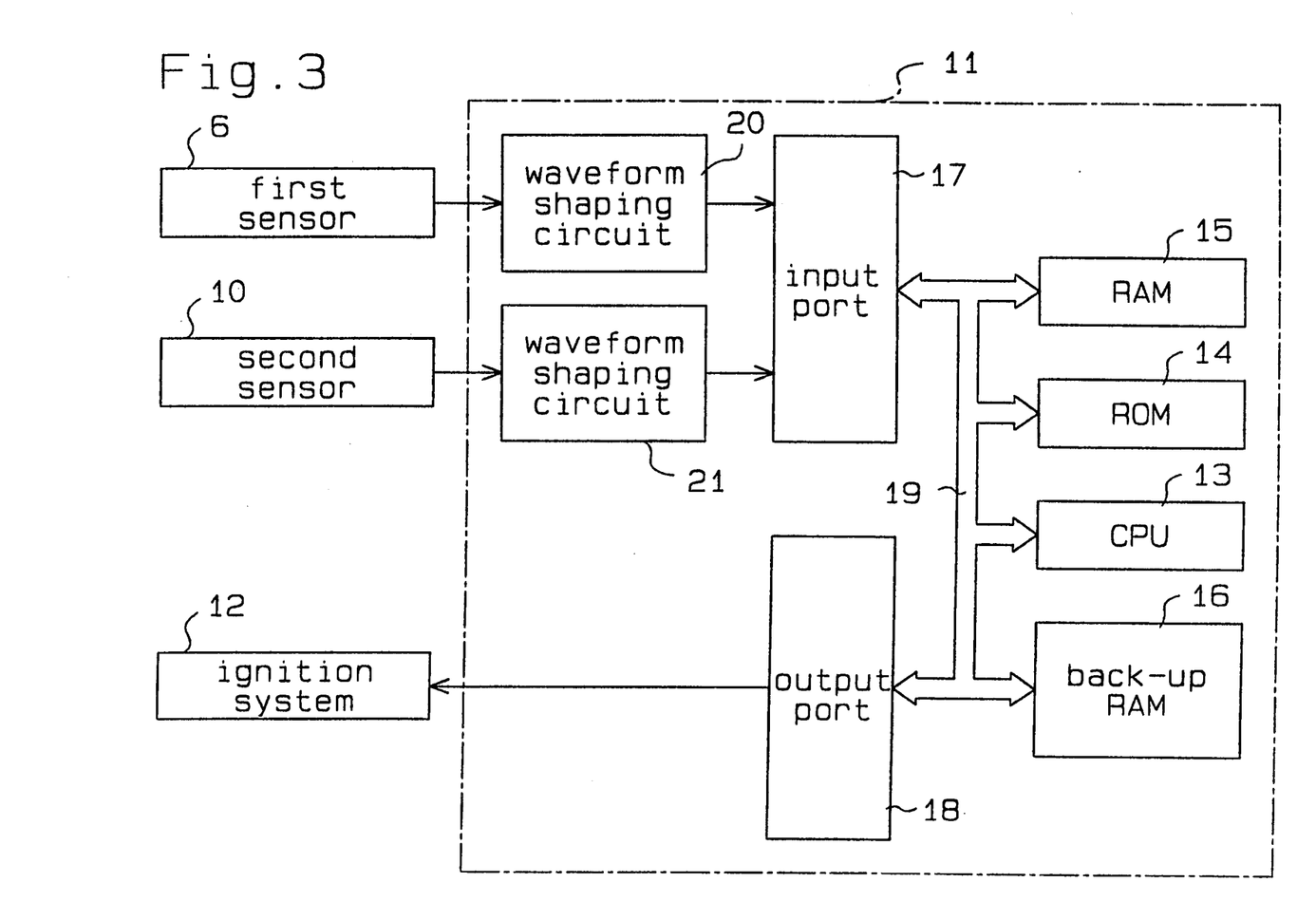
FIG. 3 shows a block diagram of an ECU (Electric Control Unit) configuration used in the first embodiment.

As shown in FIG. 3, the first sensor 6 and the second sensor 10 are connected to the input of an electronic control unit 11 (ECU). An ignition system 12, comprising an ignitor and an ignition coil, is electronically connected to the output of the ECU 11. The ECU 11 controls the ignition system 12 based on the signals generated by the sensors 6 and 10. If four cylinders in the gasoline engine were referred to as the first, second, third and fourth cylinders, according to their arrangement order, the ECU 11 controls the ignition system 12 to ignite the cylinders in the following sequence: first, third, fourth and second cylinders, at a crank angle interval of 180 degrees.

The ECU 11 includes a central processing unit (CPU) 13, a read only memory (ROM) 14, a random access memory (RAM) 15, a back-up RAM 16, an input port 17 and an output port 18. The foregoing elements are interconnected, via buses 19. ROM 14 stores control programs and initial data, for detecting the cylinders to be ignited when the engine is activated. CPU 13 executes various operations according to the control programs and the initial data, such as several flags X, F1 and F2. RAM 15 temporary stores the results accumulated by the CPU 13 and the data in the counters CST and C1, as shown in FIG. 8. The back-up RAM 16 is backed up by a battery, for temporality storing various data, in the RAM 15, even after the electric power supply to the ECU 13 is cut off.

The angular signal SG1 generated by the first sensor 6 is transmitted to the input port 17, via a waveform shaping circuit 20. The cylinder detection signal SG2 generated by the second sensor 10 is transmitted to the input port 17, via a waveform shaping circuit 21. The CPU 13 operatively controls the ignition system 12, via the output port 18, in response to the input data, such as the angular signal SG1 and cylinder detection signal SG2.

Figure 4:
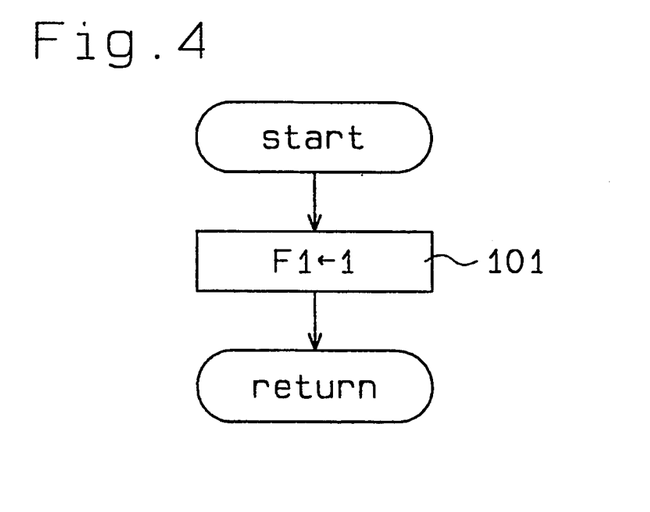
FIG. 4 shows a flow chart of a routine, for setting a first flag F1, executed by a CPU (Central Processing Unit) of the ECU of FIG. 3.

FIG. 4 shows a flow chart of a routine for setting a first flag F1, which is used for detecting the cylinders. The routine for setting the flag is executed each time the leading edge of the cylinder detection signal SG2 is detected (every 720 degrees of CA), depending on the rotation of the cam shaft 2. The first flag F1 for detecting the cylinders is set as [1], as shown in FIG. 8, when the cylinder detection signal SG2 is transmitted from the second sensor 10. After that, the flag F1 is reset to [0], when the crank shaft 1 is rotated by a predetermined angle (CA=45°), as shown in FIG. 8.

Figure 5:
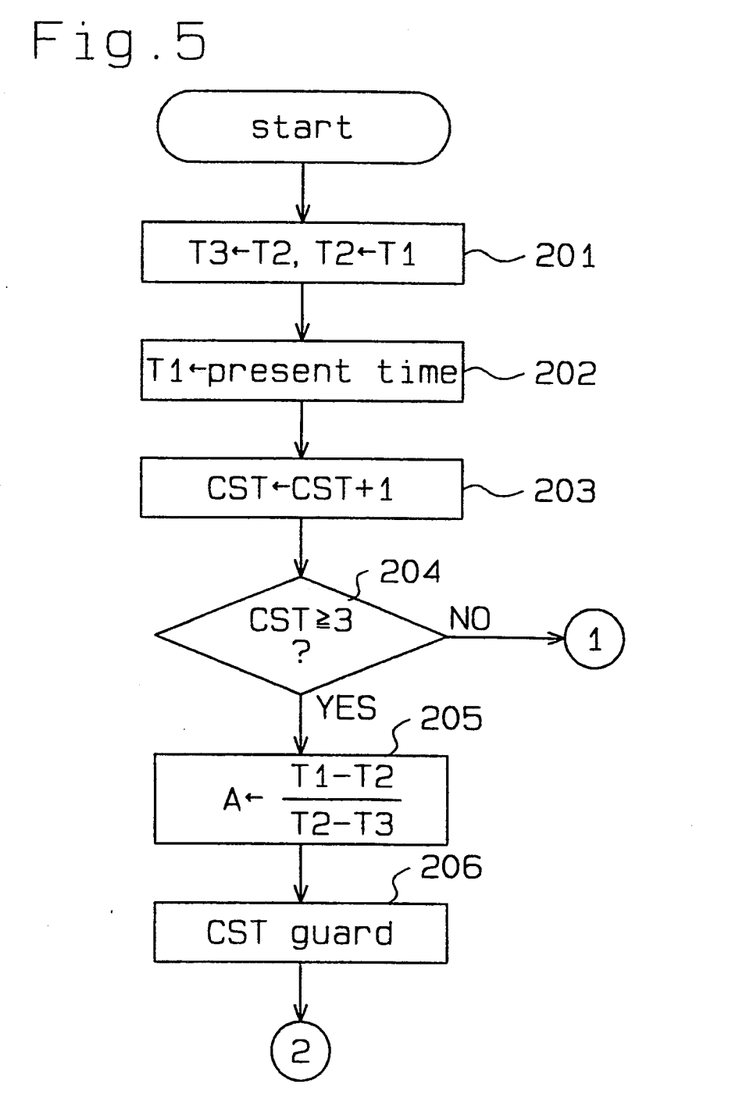
FIG. 5 shows a flow chart of a routine, for detecting cylinders, executed by the CPU of the ECU, based on an angular signal and a cylinder detection signal.
Figure 6:
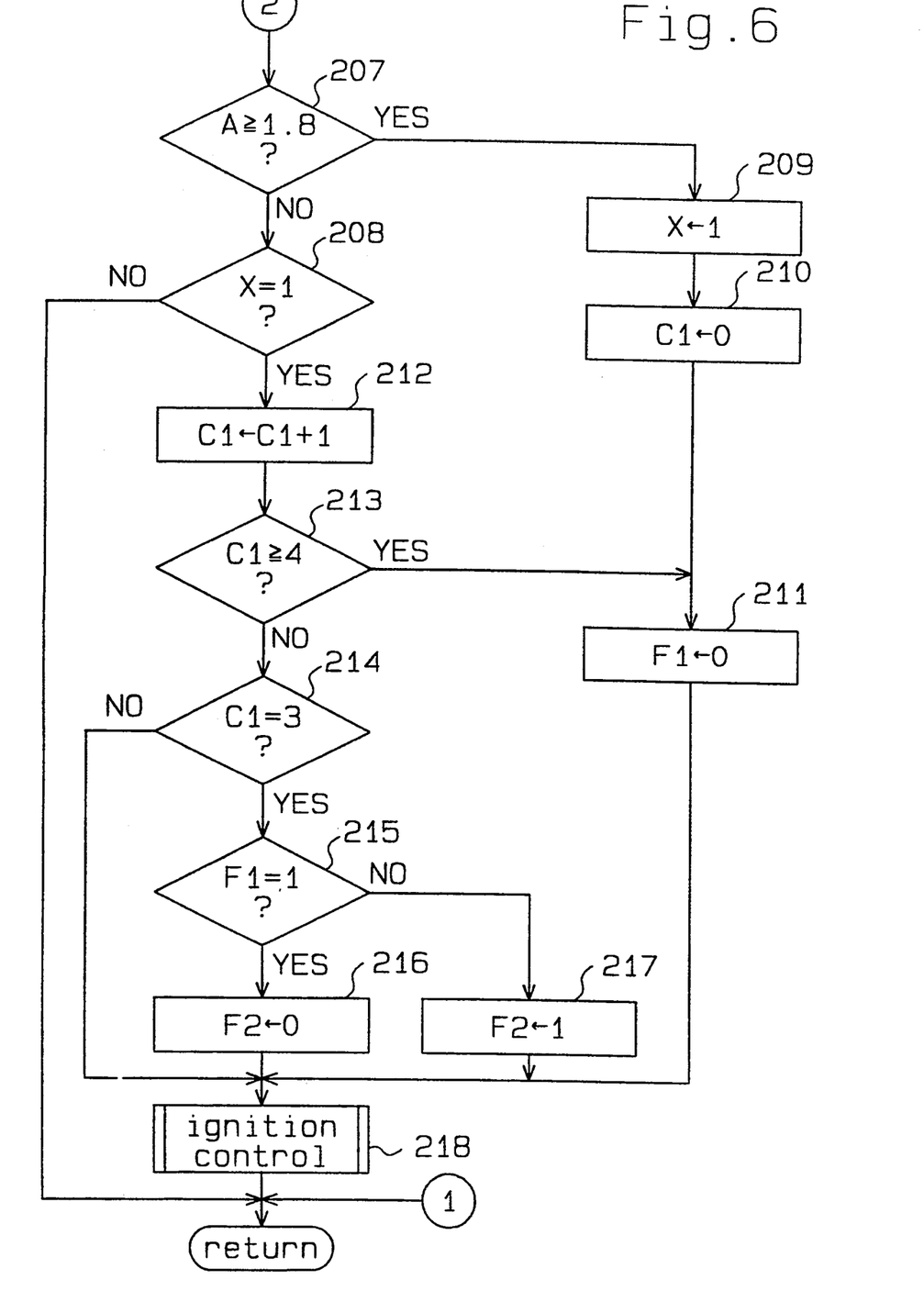
FIG. 6 shows a flow chart of operational steps, following the execution of the routine of FIG. 5.
Figure 7:
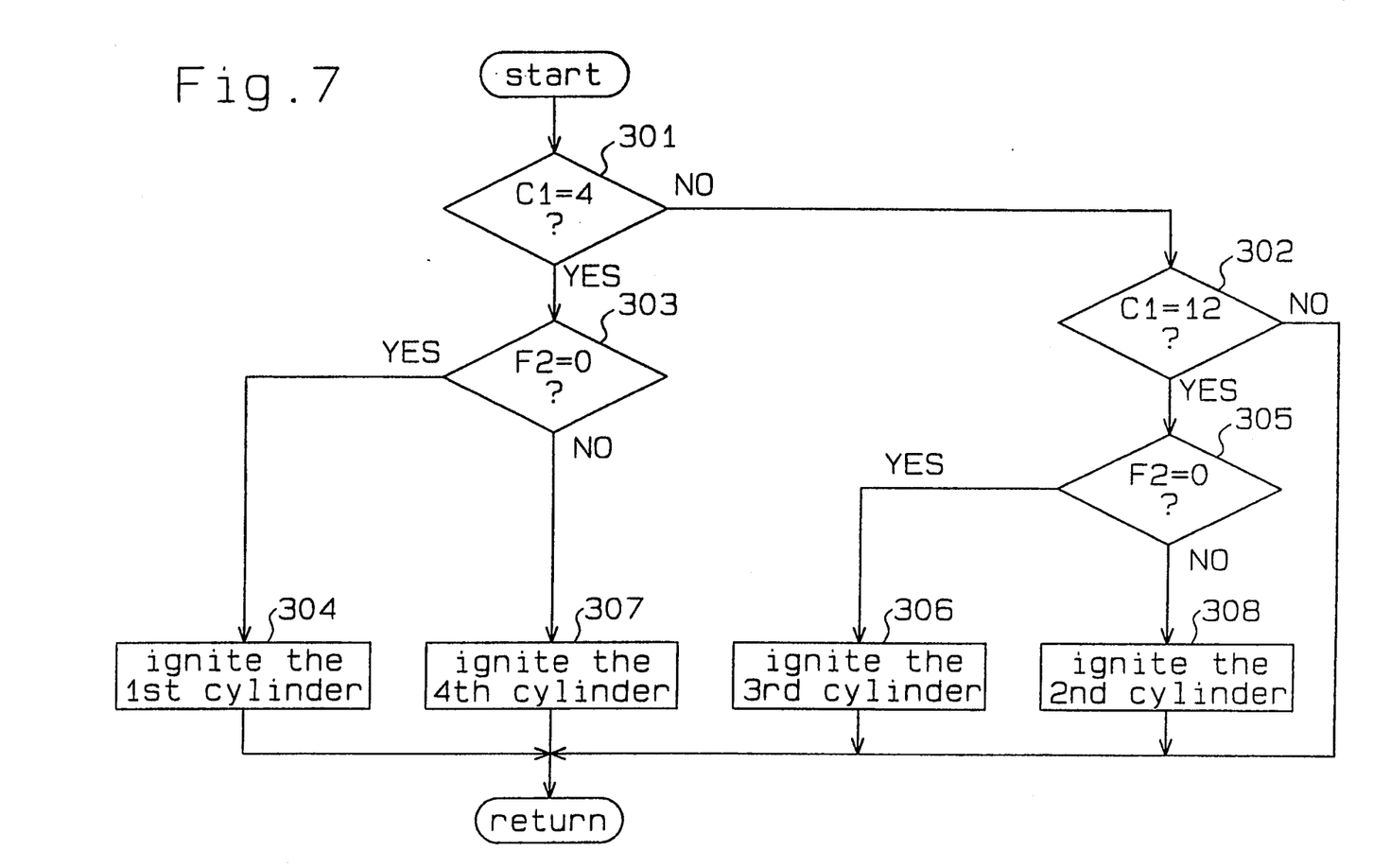
FIG. 7 shows a flow chart of a routine, for controlling the ignition timing, which complements the routine of FIG. 5.

The flow charts in FIGS. 5 and 6 show a routine for detecting the cylinders, based on the angular signal SG1 and the cylinder detection signal SG2. This routine is executed each time the leading edge of the angular signal SG1 is detected (in this case, every 22.5 degrees), depending on the rotation of the crank shaft 1. The flow chart in FIG. 7 shows a routine for controlling the ignition timing of each cylinder, based on the result of the cylinder detection operation. The routine for controlling the ignition timing is executed at a predetermined timing after the cylinder detection operation has been executed.

The routine operations for detecting the cylinders, as shown in FIGS. 5 and 6, are executed based on the counter CST, the counter C1, the flag X and the second flag F2 of FIG. 8, used for detecting the cylinders. The counter CST counts the number of times the routine for detecting the cylinders has been executed, after the engine is activated, and stores the counted value. The value in the counter CST is incremented by [1] until this value reaches a predetermined number (in this embodiment, the maximum number is 3). When the value in the counter becomes [3], the CPU 13 stores the value in the counter CST as a guard value. This is referred to as a guard operation.

The counter C1 counts the number of angular signals SG1 transmitted from the first sensor 6, and sequentially stores the values [0] through [14] in relation to the teeth 4 of the sensor 6. The counter C1 is reset each time the reference signal SGr is generated by the sensor 6 and is input to the ECU 11. The flag X is caused to change state from [0] to [1], when the reference signal SGr is input at the first time, relative to the revolution of the crank shaft 1. While the engine is rotating, the flag X remains in the state [1].

The second flag F2 for detecting the cylinders, is set in the following manner. The expecting period, for generating the cylinder detecting signal, elapses after the cylinder detection signal SG2 was input at the first time, in relation to the revolution of the cam shaft 2, the second flag F2 is caused to change its state from [1] to [0]. Subsequently, if the next expecting period arrived and no cylinder detecting signal SG2 were input during that period, the second flag F2 is caused to change its state from [0] to [1], after the expecting period has elapsed. In this embodiment, the expecting period would fall in the range of the values [1] through [3] of the counter C1.

According to this embodiment, after the engine is activated, the actual time for detecting cylinders is stored in a first time storing region T1 of the RAM 15. When the cylinder detection routine is executed, the time stored in the first time storing region T1 is shifted into a second time storing region T2, and stored therein. Further, the time stored in the second time storing region T2 is shifted into a third time storing region T3 and stored therein.

The counter CST, flag X and the first, second and third time storing regions T1 through T3 are cleared, by executing an initialize routine (not shown) when an ignition key is turned on.

The engine is actuated at timing t1, as shown in FIG. 8. When the first angular signal SG1 is input, the CPU 13 starts executing the cylinder detection routine, as shown in FIGS. 5 and 6. Thereafter, the routine for controlling the ignition timing, as shown in FIG. 7, is executed. The steps of each routine will now be described.

In a first step 201 of the cylinder detection routine (FIG. 5), the operation for updating times stored in the time storing regions T1 and T2 is executed. In other words, the times stored in the time storing regions T1 and T2 are shifted into the time storing regions T2 and T3, and stored therein. However, immediately after the engine is actuated, no actual time is stored in the time storing regions T1 and T2. Therefore, the CPU 13 skips step 201, and starts at step 202, where the CPU 13 stores the actual time in the time storing region T1.

At step 203, the CPU 13 increments the counter CST, so that the stored value in the counter CST is changed from [0] to [1]. Thereafter, at step 204, the CPU 13 determines whether the value stored in the counter CST is greater than [3]. Immediately, after the engine is actuated, the value in the counter CST is [1]. Therefore, the answer to the inquiry at step 204 is [NO], and the CPU 13 terminates the execution of the routine, which corresponds to the timing t1.

As the value in the counter CST becomes equal to [3], at timing t3, after the routine is repeatedly executed responsive to the input of the angular signal SG1, at timing t2 of FIG. 8, the routine determines at step 204 that (CST≧3). As a result, the CPU 13 advances to step 205.

At step 205, the CPU 13 calculates the time interval ratio A of the angular signal SG1, by using the following equation:

$$A = (T1 - T2)/(T2 - T3) \tag{1}$$

In this equation (1), the time difference (T2−T1) of each time stored in the time storing regions T2 and T1, indicates the input time difference between the angular signals which were input at the latest and the last time. The time difference (T3−T2) of each time stored in the time storing regions T3 and T2, represents the input time difference between the angular signals SG1, which were input at the last time and two times before. The time interval ratio A represents the ratio of those time differences.

In the above equation (1), when the last stored angular signal SG1 among the three consecutively stored angular signals SG1 does not correspond to the reference signal SGr, the time interval ratio A would be set as [1], since the above input time differences are substantially equal. On the contrary, when the last stored signal corresponds to the reference signal SGr, the time interval ratio A would be theoretically set as [2]. Therefore, calculating the time interval ratio A, the angular signal SG1 can be compared to the reference signal SGr.

Following the above step, the CPU 13 continuously performs the guard operation for the value of the counter CST, at step 206. Because the value in the counter CST reaches the upper limit value [3], the CPU 13 retains the value of the counter CST as it is. Next, the CPU 13 determines, at step 207, whether the time interval ratio A, that is calculated at step 205, is equal to or larger than the predetermined value, as shown in FIG. 6. In this embodiment, the predetermined value is selected as [1.8]. It is based on experiments, and is slightly smaller than the theoretical value.

Each one of three angular signals SG1 is input at an equal time interval, corresponding to the timing t1 through t3, as shown in FIG. 8. Therefore, the time interval ratio A is smaller than the value [1.8]. As a result, the CPU 13 determines that the condition (A≧1.8), at step 207, is not satisfied, and the CPU 13 advances to step 208. The CPU 13 then determines at step 208, whether or not the flag X corresponds to the value [1]. The flag X is reset as [0] when the engine is activated. Therefore, the CPU 13 determines that the condition (X=1) is not met, and terminates the routine.

At timing t4, as shown in FIG. 8, the time interval ratio A becomes equal to, or larger than [1.8] (step 205), when the first sensor 6 transmits the reference signal SGr which corresponds to the second recess 4B of the first rotor 3. The CPU 13 determines that the condition at step 207 is met, and sets the value of the flag X as [1] (step 209). Further, the CPU 13 resets the value of the counter C1 as [0], at step 210, and sets the value of the flag F1 as [0], at step 211. At step 211, the CPU 13 clears the cylinder detection signals which were previously stored, in order to execute the cylinder detection operation. After that, the CPU 13 advances its operation to step 218, in order to execute the ignition timing control routine (ITCR).

When the conditions at steps 207 and 208 are not met, steps 212 through 217 are not executed for the following reasons.

The value in the counter C1 is not totally reliable, until the time interval ratio A becomes equal to, or larger than [1.8] after the engine is activated, in other words, until the first reference signal SGr is transmitted based on the detection of the second recess 4B. Therefore, according to this embodiment, when the time interval ratio A is less than [1.8], after the engine was activated, the counter C1 does not start executing the counting operation at step 212. After the time interval ratio A exceeds the value [1.8], the counter C1 starts counting after the reset operation (step 210) is executed.

At timing t5, as in shown FIG. 8, when the first sensor 6 transmits the angular signal SG1, corresponding to the tooth 4 that follows the second recess 4B, the time interval ratio A becomes smaller than [1.8] (step 205), as shown in FIG. 5. On the other hand, the flag X has been set to [1] at step 209, at the previous timing t4. Therefore, the CPU 13 determines that the step 208 is satisfied after the CPU 13 has determined that the step 207 was not satisfied as shown in FIG. 6, and the CPU 13 advances its operation to step 212. The CPU 13 increments the value of the counter C1 by [1] at step 212. In this case, the value of the counter C1 is changed from [0] to [1].

The CPU 13 determines whether the value of the counter C1 is equal to, or larger than [4], at step 213. Furthermore, the CPU 13 determines whether or not the value stored in the counter C1 is [3], at the step 214. The CPU 13 determines that both conditions, at steps 213 and 214 are not met, because the value in the counter C1 has been set as [1]. Therefore, the CPU 13 executes step 218.

When the ignition timing control routine (ITCR) is repeatedly executed at the timings t4 through t7, as shown in FIG. 8, the value of the counter C1 is incremented by [1] based on the execution of step 212, corresponding to each timing. When the value of the counter C1 becomes [3], at the routine corresponding to the timing t7, the condition (C1=3) at step 214 is satisfied, and the CPU 13 executes step 215, and determines whether or not the flag F1 corresponds to [1].

In the expecting period, when the cylinder detection signal is caused to generate the values [1] through [3] of the counter C1, which correspond to the timing period of the timing t5 through t7, for example, if the cylinder detection signal SG2 is generated at the timing t6 (FIG. 8), the CPU 13 sets the first flag F1 as [1], by executing the flag setting routine (FIG. 4). Therefore, the CPU 13 determines that the condition (F1=[1]) of step 215 is satisfied in the routine for detecting cylinders corresponding to the timing t7, so as to set the value of the second flag F2 as [0], at step 216. Then, the CPU 13 advances its operation to step 218, in order to execute the ignition timing control routine.

In the cylinder detection routine corresponding to timing t8 (FIG. 8), the value of the counter C1 is incremented to [4] by executing step 212, as shown in FIG. 6. The CPU 13 determines that the condition at step 213 is satisfied, and the CPU 13 does not execute steps 214 through 217. Subsequently, the CPU 13 executes step 211, in order to execute the operation for resetting the value of the first flag F1 as [0]. Thereafter, the CPU 13 executes the ignition timing control routine, at step 218.

As described above, the first flag F1 is set as [1] during the period only when the values of the counter are set between [2] and [4], immediately after the cylinder detection signal is input.

In the routine corresponding to timing t9, shown in FIG. 8, the value of the counter C1 becomes [12], the value of the second flag F2 is maintained as [0]. In the expecting period, when the cylinder detection signal might be generated (in this case, the period of timings t10 through t12 when the value of the counter C1 ranges between [1] and [3]), if the cylinder detecting signal SG2 is not transmitted, the routine for setting the flag value is not executed (FIG. 4). Therefore, even after the expecting period has elapsed, the value of the first flag F1 remains [0]. Therefore, in the cylinder detection routine corresponding to the timing t12 (FIG. 8), the CPU 13 determines whether the condition (F1=[1]) at step 215 (FIG. 6) has not been met, and sets the value of the second flag F2 to [1], at step 217. Thereafter, the CPU 13 executes the ignition timing control routine, at step 218.

In the cylinder detecting routine corresponding to the timing t13 (FIG. 8), the value of the counter C1 becomes [4], and the value of the second flag F2 becomes [1]. In the cylinder detection routine corresponding to the timing t14 (FIG. 8), the value of the counter C1 becomes [12], and the value of the second flag F2 becomes [1].

The ignition timing control routine, following steps 211, 214, 216 and 217 will now be described referring to FIGS. 7 and 8, during the execution of the cylinder detection routine corresponding to the timings t8, t9, t13 and t14.

In the ignition timing control routine, the CPU 13 first determines whether or not the value of the counter C1 reaches [4], at step 301. Thereafter, the CPU 13 determines whether or not the value of the counter C1 reaches [12], at step 302. In the ignition timing control routine corresponding to the timings t1 through t7, both conditions at steps 301 and 302 are not met. Therefore, the CPU 13 does not execute the next operation, and ends the ignition timing control routine.

In the timing t8 shown in FIG. 8, when the value of the counter C1 becomes [4], the condition (C1=4) of step 301 is satisfied, and the CPU 13 determines whether or not the second flag F2 is set to [0], at step 303. At the timing t8, as described above, the second flag F2 is set to [0]. The CPU 13 determines that the condition (F2=0) at step 303 is satisfied, and it operatively controls the ignition system 12, in order to ignite a first cylinder, at step 304. As a result, after the first reference signal SGr is input, when the crank shaft 1 is rotated by approximately 90 degrees, the first cylinder is caused to ignite.

In the timing t9 shown in FIG. 8, when the value of the counter C1 becomes [12], the condition (C1=12) of the step 302 is satisfied, and the CPU 13 determines whether or not the second flag F2 is set to [0], at step 305. At the timing t9, as described above, the second flag F2 is set to [0].

Therefore, the CPU 13 determines that the condition (F2=0) of the step 305 is satisfied, and the CPU 13 operatively controls the ignition system 12, in order to ignite a third cylinder at step 306. As a result, after the first reference signal SGr is input, when the crank shaft 1 is rotated by approximately 270 degrees, the third cylinder is caused to ignite.

Furthermore, at the timing t13 shown in FIG. 8, when the value of the counter C1 becomes [4], the condition (C1=4) of the step 301 is satisfied, and the CPU 13 determines whether or not the second flag F2 is set to [0], at step 303. At the timing t13, the second flag F2 is set to [1]. Therefore, the CPU 13 determines that the condition (F2=0) of the step 303 is not met, and the CPU 13 operatively controls the ignition system 12, in order to ignite a fourth cylinder, at step 307. As a result, after the first reference signal SGr is input, when the crank shaft 1 is rotated by approximately 450 degrees, the fourth cylinder is caused to ignite.

At the timing t14 shown in FIG. 8, when the value of the counter is set to [12], the condition (C1=12) of step 302 is satisfied, and the CPU 13 determines whether or not the second flag F2 is set to [0], at step 305. As described above, the second flag F2 is set to [1], at step 305 and the CPU 13 determines that the condition (F2=0) at step 305 is not met. The CPU 13 operatively controls the ignition system 12, in order to ignite a second cylinder at step 308. As a result, after the first reference signal SGr is input, when the crank shaft 1 is rotated by approximately 630 degrees, the second cylinder is caused to ignite.

According to the first embodiment, after the first sensor 6 transmits the first reference signal SGr and the second sensor 10 transmits the cylinder detection signal SG2, when the value of the counter C1 reaches one value of [4] and [12], the CPU 13 inquires as to the condition ([0] or [1]) of the second flag F2. The crank angle is defined in order to control the ignition timing for each one of the four cylinders, corresponding to the combination of two predetermined values of the counter C1, and two conditions of the second flag F2. Therefore, the number of sensors needed for setting the predetermined crank angle is reduced.

The condition of the second flag F2 is defined based on whether or not the cylinder detection signal SG2 is generated, during the expecting period for generating that signal, and also based on whether or not the value of the counter C1 coincides with the specific value ([3]), during the same period. Therefore, even if the cylinder detecting signal SG2 were not transmitted at every revolution of the crank shaft 1, the condition of the second flag F2 can be changed at every revolution of the crank shaft 1 (steps 214 and 215).

Further, according to the this embodiment, and as illustrated in FIG. 8, the crank shaft 1 is caused to rotate by approximately 90 degrees, during the period before the first sensor 6 transmits the first reference signal SGr, after the engine is activated. While the period for the value of the counter C1 becomes the specific value [4] after the first reference signal SGr has been transmitted, the crank shaft 1 is further rotated by approximately another 90 degrees. Therefore, the crank shaft 1 rotates approximately 180 degrees before the cylinder to be ignited a first time is specified, after the engine has been activated.

Even if the crank shaft 1 were rotated by a maximum 360 degrees, before the first reference signal SGr is transmitted, after the engine has been activated, at least one of the cylinders to be ignited can be defined, before the crank shaft 1 is rotated by another 90 degrees. Therefore, the maximum crank angle for defining the specific cylinder does not exceed 720 degrees in comparison to conventional systems.

Figure 9:
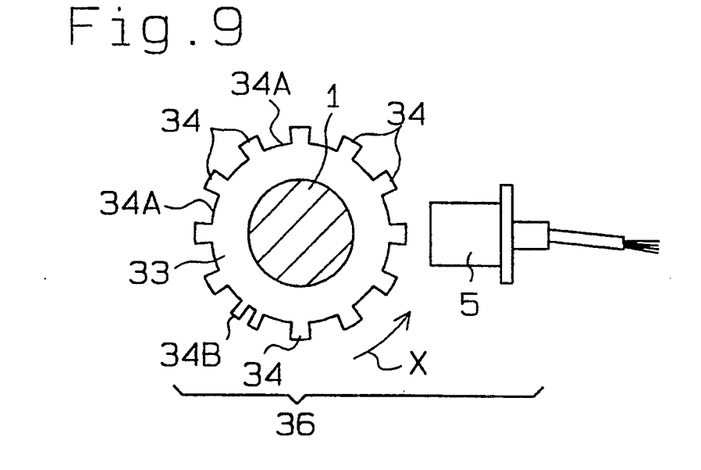
FIG. 9 shows a simplified schematic view of a first sensor for the crank shaft, in a second embodiment according to the present invention.

Although only one embodiment of the present invention has been described herein, it should be apparent to those skilled in the art that the present invention may be embodied in many other specific forms without departing from the spirit or scope of the invention. Particularly, it should be understood that the following embodiments are contemplated by the present invention:

(1) The present invention can be employed in an engine having five or more cylinders instead of the four cylinders engine as described above;

(2) The crank angle detecting system of the present invention can be employed in the fuel injection control system instead of the engine ignition control;

(3) Slits can be formed on the peripheral surface of the rotors 3 and 7 to replace tooth 4 of the first rotor 3 and the tooth 8 of the second rotor 7. Photo emitting elements and photo receiving elements can be employed as replacement for the first and second electromagnetic pickups. In this case, a photo emitting element and a photo receiving element are arranged at both sides of the slit. While the rotors 3 and 7 are rotating, the photo emitting element emits light beam, with uniform intensity, toward the photo receiving element. This light beam is intermittently interrupted due to the rotation of the rotors. Therefore, the photo receiver element receives the light beam with fluctuating intensity. A pulse signal is intermittently generated according to the fluctuation of the light intensity. Therefore, the operational result and effect of this embodiment are similar to those of the preferred embodiment;

(4) The present invention can be applied to DLI or the ignition system which injects fuel to an independent cylinder or to a group of cylinders when the engine is activated;

(5) The timing for transmitting the cylinder detection signal SG2 form the second sensor 10, can be arbitrarily changed, by changing the install position of the second rotor 7, with respect to the cam shaft 2. Consequently, the value of the counter C1 at steps 213 and 214 (FIG. 6) should be changed according to the changed timing;

(6) The configuration of the first rotor 3 of the first sensor 6 according to the above-described embodiment can be modified, as shown in FIG. 9. A plurality of teeth 34 and recesses 34A are equiangularly formed along the peripheral surface of the first rotor 33, at equal angular intervals (for example, 30 degrees) in accordance with this embodiment. One tooth 34 is divided into two equal parts. Therefore, the width of the divided tooth 34B is narrower than that of the remaining teeth 34.

Figure 10:
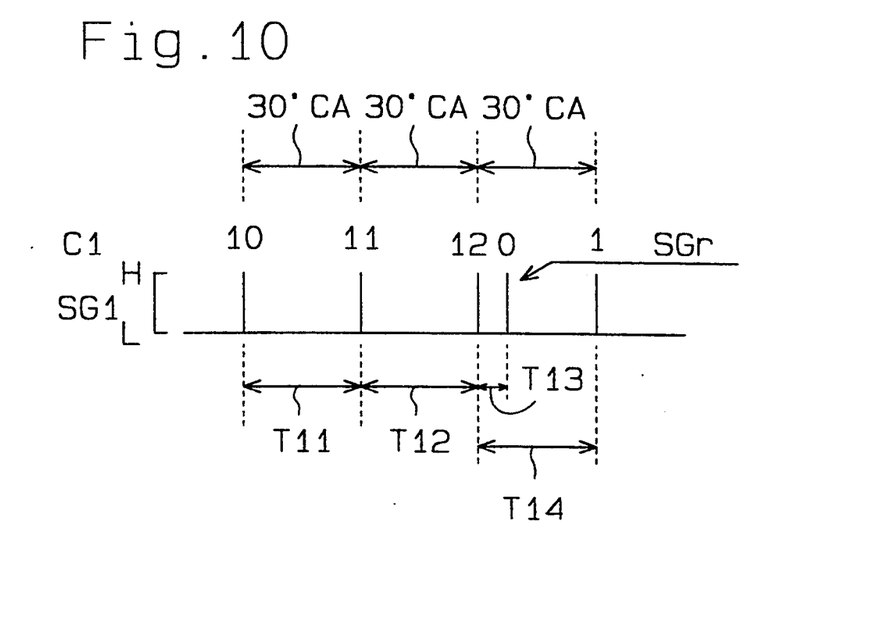
FIG. 10 shows an operative diagram for detecting the reference signal generated by the first sensor of FIG. 9.

When the rotor 33 is employed, the output signals (the signals are wave-shaped) from the first sensor 36 are shown in FIG. 10. Supposing, the time interval of each adjacent signals is sequentially defined as T11, T12, T13 and T14, the time interval ratio (T12/T11) for transmitting the signal becomes 1, where the teeth 34 are equiangularly disposed. The time interval ratio becomes (T13/T12)<$\alpha$<1 at the portion of the two divided teeth 34B. Therefore, for example, the reference signal SGr can be specified, based on whether or not the time interval ratio of the angular signals is less than $\alpha$.

What is claimed is:

1. An apparatus for detecting a rotational displacement of a rotary shaft comprising:
    a first rotary shaft;
    a first signal generating means for generating unit angular signals at predetermined angular displacements of said first rotary shaft, and for generating a first reference signal having a different timing from the unit angular signals;
    a second rotary shaft capable of completing one revolution while said first rotary shaft completes two revolutions;
    a second signal generating means for generating a second reference signal for each revolution of said second rotary shaft;
    counting means for counting said unit angular signals, for storing the counted value, and for initializing the counted value every time said first reference signal is generated; and
    detecting means for determining whether said second reference signal is generated by said second signal generating means when the counted value of unit angular signals reaches a predetermined value, and for detecting the rotational displacement of said first rotary shaft in response to the determination.

2. The apparatus according to claim 1, wherein said second signal generating means generates said second reference signal at a different time than said first signal generating means generates said first reference signal.

3. The apparatus according to claim 1, wherein said first signal generating means includes:
    a first rotor which is integrally and rotatably secured to said first rotary shaft;
    a plurality of first teeth that are separated by a plurality of first recesses, said first teeth being located along the periphery of said first rotor;
    a second recess formed between two first teeth, wherein said second recess is wider than said first recesses; and
    first pickup means arranged adjacent the peripheral surface of said first rotor for generating said unit angular signals and said first reference signal in response to said first pickup means detecting said first teeth, said first recesses and said second recess.

4. The apparatus according to claim 1, wherein said first signal generating means including:
    a first rotor which is integrally and rotatably secured to said first rotary shaft;
    a plurality of first teeth that are separated by a plurality of first recesses, said first teeth being located along the periphery of said first rotor;
    a second tooth located along the periphery of said first rotary shaft, wherein said second tooth is narrower than each of said first teeth; and
    first pickup means arranged adjacent to the peripheral surface of said first rotor for generating said unit angular signals and said first reference signal in response to said first pickup means detecting said first teeth, said first recesses and said second tooth.

5. The apparatus according to claim 4 further including a second rotor which is integrally and rotatably secured to said second rotary shaft and wherein said second signal generating means includes:
    a third tooth which is integrally and rotatably secured to said second rotary shaft and which extends radially from the second rotor; and
    second pickup means arranged adjacent to the periphery of said second rotor, for generating said second reference signal in response to said second pickup means detecting said third tooth.

6. The apparatus according to claim 1, wherein said first and second rotary shafts include a crank shaft and a cam shaft of a multiple cylinder-type internal combustion engine.

7. The apparatus according to claim 1, wherein said counting means and said detecting means include electronic control apparatus.

8. An apparatus for detecting a rotational displacement of a crank shaft of a multiple cylinder-type internal combustion engine, the apparatus comprising:
    a first rotor which is integrally and rotatably secured to said crank shaft;
    a plurality of first teeth that are separated by a plurality of first recesses, said first teeth being located along the periphery of said first rotor;

a second recess formed between two first teeth, wherein said second recess is wider than said first recesses; and first signal generating means for generating unit angular signals at predetermined angular displacements of said first rotary shaft, and for generating a first reference signal having a different timing from the unit angular signals, wherein said first signal generating means includes first pickup means arranged adjacent to the periphery of said first rotor for generating said unit angular signals and said first reference signal when said first pickup means detects said first teeth, said first recesses and said second recess;

a cam shaft capable of completing one revolution while said crank shaft completes two revolutions;

a second tooth integrally and rotatably secured to said cam shaft;

a second signal generating means for generating a second reference signal for each revolution of said second rotary shaft, wherein said second signal generating means includes a second pickup means arranged adjacent to the periphery of said cam shaft for generating said second reference signal in response to said second pickup means detecting said second tooth;

counting means for counting said unit angular signals, for storing the counted value, and for initializing the counted value every time said first reference signal is generated; and detecting means for determining whether said second reference signal is generated by said second signal generating means when the counted value of unit angular signals reaches a predetermined value, and for detecting the rotational displacement of said crank shaft in response to the determination.

9. The apparatus according to claim 8, wherein said counting means and detecting means include electronic control apparatus.

* * * * *